Figure 1:
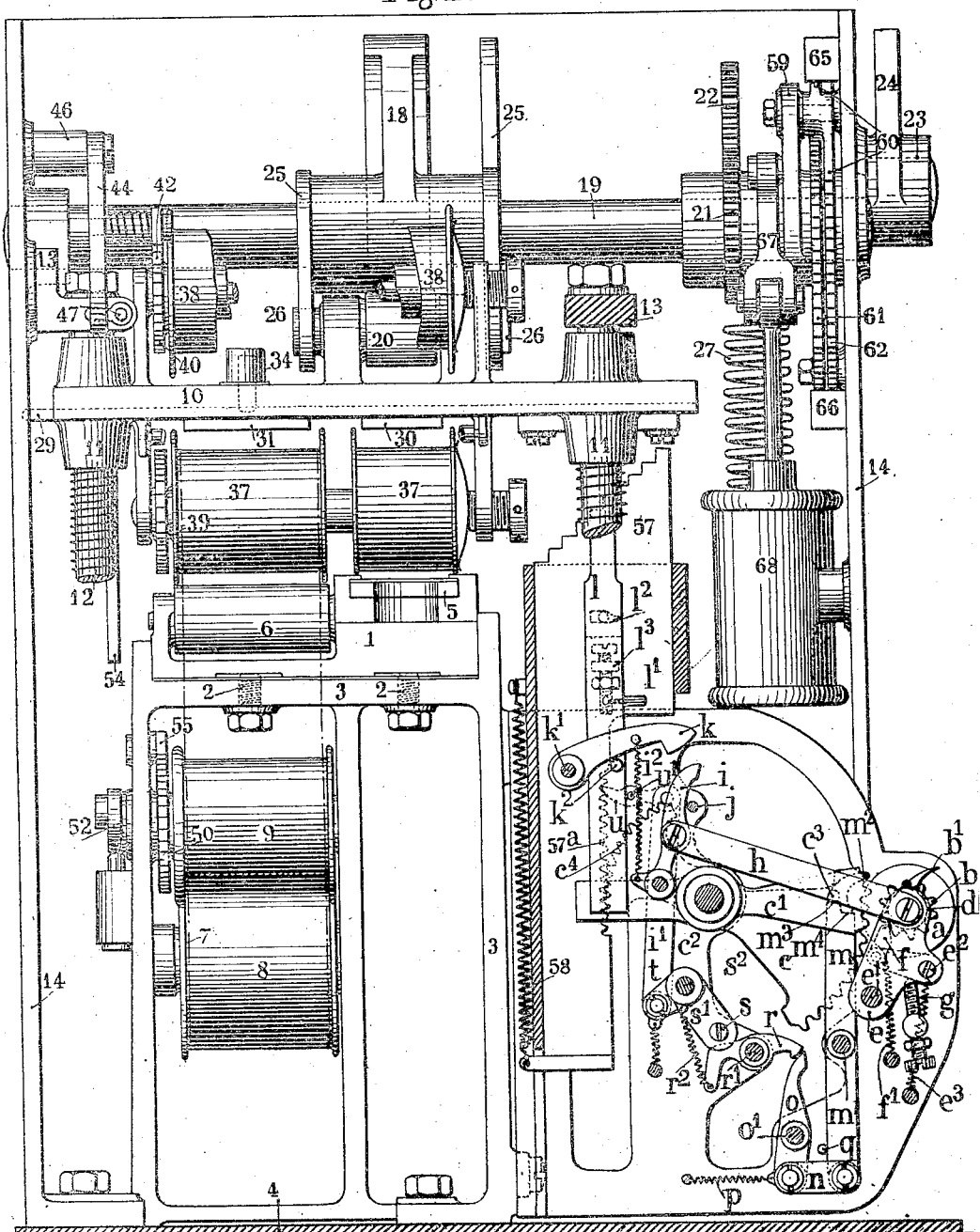

G. I. F. SOULAGE.
MACHINE OR APPARATUS FOR PRINTING, CHECKING, AND AUTOMATICALLY SUMMING UP THE VALUES OF TICKETS OF DIFFERENT KINDS AND SERIES.
APPLICATION FILED MAY 7, 1907.

953,493. Patented Mar. 29, 1910.

5 SHEETS—SHEET 2.

WITNESSES
W. M. Avery
J. P. Davis

INVENTOR
Georges Isidore Ferdinand Soulage
BY Munn & Co.
ATTORNEYS

G. I. F. SOULAGE.
MACHINE OR APPARATUS FOR PRINTING, CHECKING, AND AUTOMATICALLY SUMMING UP THE VALUES OF TICKETS OF DIFFERENT KINDS AND SERIES.
APPLICATION FILED MAY 7, 1907.

953,493.

Patented Mar. 29, 1910.

5 SHEETS—SHEET 3.

G. I. F. SOULAGE.
MACHINE OR APPARATUS FOR PRINTING, CHECKING, AND AUTOMATICALLY SUMMING
UP THE VALUES OF TICKETS OF DIFFERENT KINDS AND SERIES.
APPLICATION FILED MAY 7, 1907.
953,493.
Patented Mar. 29, 1910.
5 SHEETS—SHEET 5.
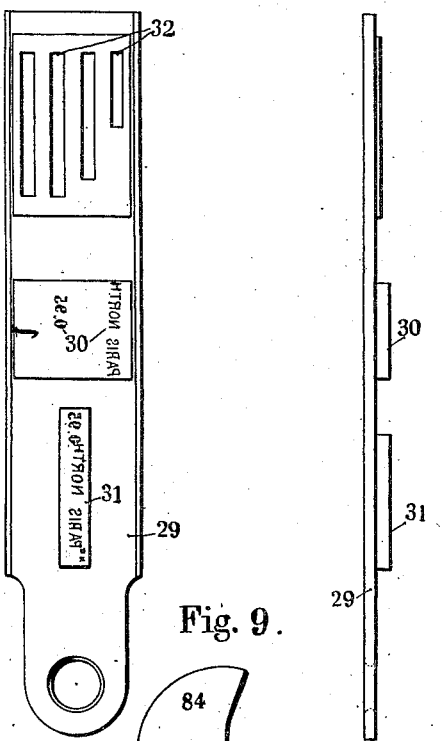
Fig. 5.
Fig. 6.
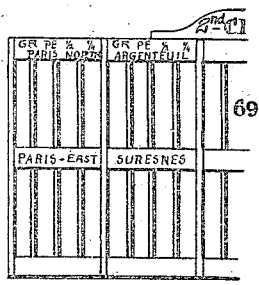
Fig. 7.
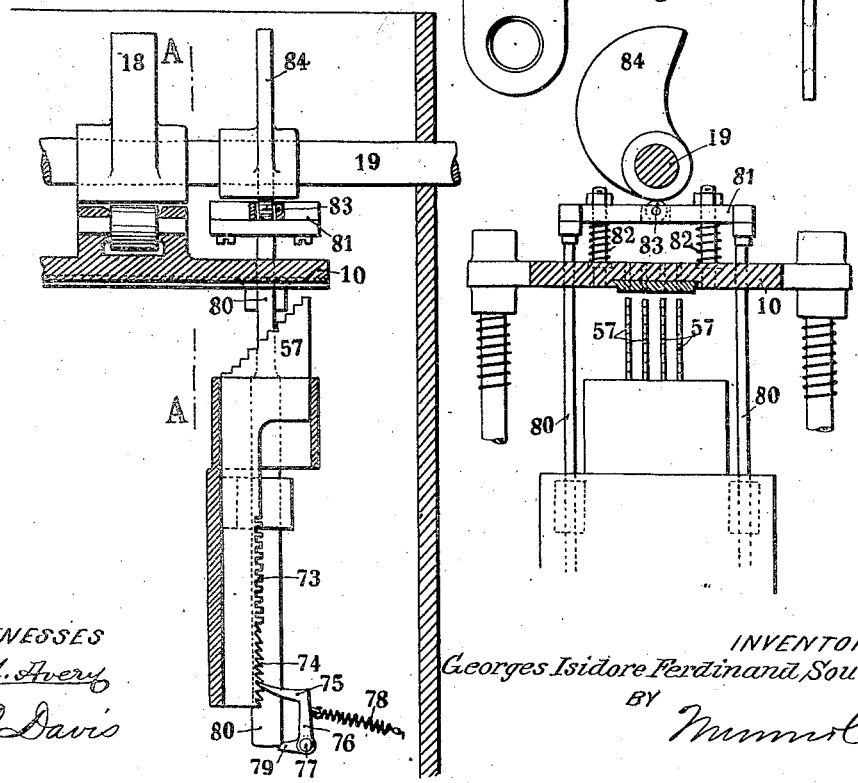
Fig. 8.
Fig. 9.
WITNESSES
W. M. Avery
J. P. Davis
INVENTOR
Georges Isidore Ferdinand Soulage
BY
Munn & Co.
ATTORNEYS

UNITED STATES PATENT OFFICE.

GEORGES ISIDORE FERDINAND SOULAGE, OF PARIS, FRANCE, ASSIGNOR TO SOCIÉTÉ UNIVERSELLE DES APPAREILS CONTROLEURS, OF PARIS, FRANCE.

MACHINE OR APPARATUS FOR PRINTING, CHECKING, AND AUTOMATICALLY SUMMING UP THE VALUES OF TICKETS OF DIFFERENT KINDS AND SERIES.

953,493.  Specification of Letters Patent.  Patented Mar. 29, 1910.

Application filed May 7, 1907. Serial No. 372,374.

*To all whom it may concern:*

Be it known that I, GEORGES ISIDORE FERDINAND SOULAGE, of 44 Rue Chanzy, in the city of Paris, Republic of France, mining engineer, have invented Improvements in Machines or Apparatus for Printing, Checking, and Automatically Summing Up the Values of Tickets of Different Kinds and Series, of which the following is a full, clear, and exact description.

My invention is an improvement in machines or apparatus for printing, checking, and automatically summing the values of tickets of different kinds in series, and consists in certain novel constructions and combinations of parts hereinafter described and claimed.

The present invention relates to an improvement in machines of the character specified, and is designed to provide a small portable machine for printing and checking tickets of different classes and kinds and for automatically adding up the corresponding receipts.

The present invention is an improvement over my British Patent 11,541 of 1906 and my copending application No. 322390 filed on June 19, 1906, and the essential points of difference are that the said patent and the application relate to a machine in which the printing blocks are separated from the perforated plates. The device comprising essentially a chain of printing blocks hinged to one another and movable on a drum and a chain of slotted plates also hinged to one another and carried by a drum.

The subject of the present application is a portable machine, each printing plate carrying the slots, and the plates not being connected together. This method of procedure possesses many inconveniences among which may be stated the following: first, the preparation of the ticket takes considerable time and renders the issue thereof slow; second, the data written upon the ticket is not always legible and is liable to be effaced by the handling of the passenger; third, the keeping of the accounts in connection with the tickets is troublesome, in that errors may occur in the making out of the ticket, and for checking purposes the employee is obliged to repeat all the directions which he has written upon the ticket, either upon a stub, or in a register, and the method of checking does not furnish the guarantees desired by the railroad companies, since the transcription may become altered by mistake or otherwise.

The object of the present invention is to provide a machine which will remedy these inconveniences, that will effect by a single operation, first the impression upon each ticket of the date, the destination, the price, the route, and the number of days for which the ticket is available. Second, the simultaneous impression upon a checking sheet of all the data placed on the ticket. Third, the automatic adding up of the sums collected.

A further object of the invention is to produce a mechanism simple, portable, of small dimensions, and one in which the use shall not require any previous change, and whose up-keep shall be inexpensive, and which shall be suitable for all kinds of tickets.

The machine comprises broadly, first a fixed impression table in which the ticket to be printed is held and which carries a checking sheet which unrolls after each impression, and which presents the portion to receive the impression in the same plane as the ticket. Second, a movable plate above the table into which is introduced the block or printing plate bearing the data which is to be printed upon the ticket and upon the checking sheet. Interchangeable blocks or printing plates corresponding to the different varieties of tickets and each bearing a grid provided with a plurality of parallel slots. Fourth, vertical movable bars, whose upper end is stepped for engaging the slots for a purpose to be presently described. Fifth, an adding apparatus operated by the movement of the bars.

Figure 2:
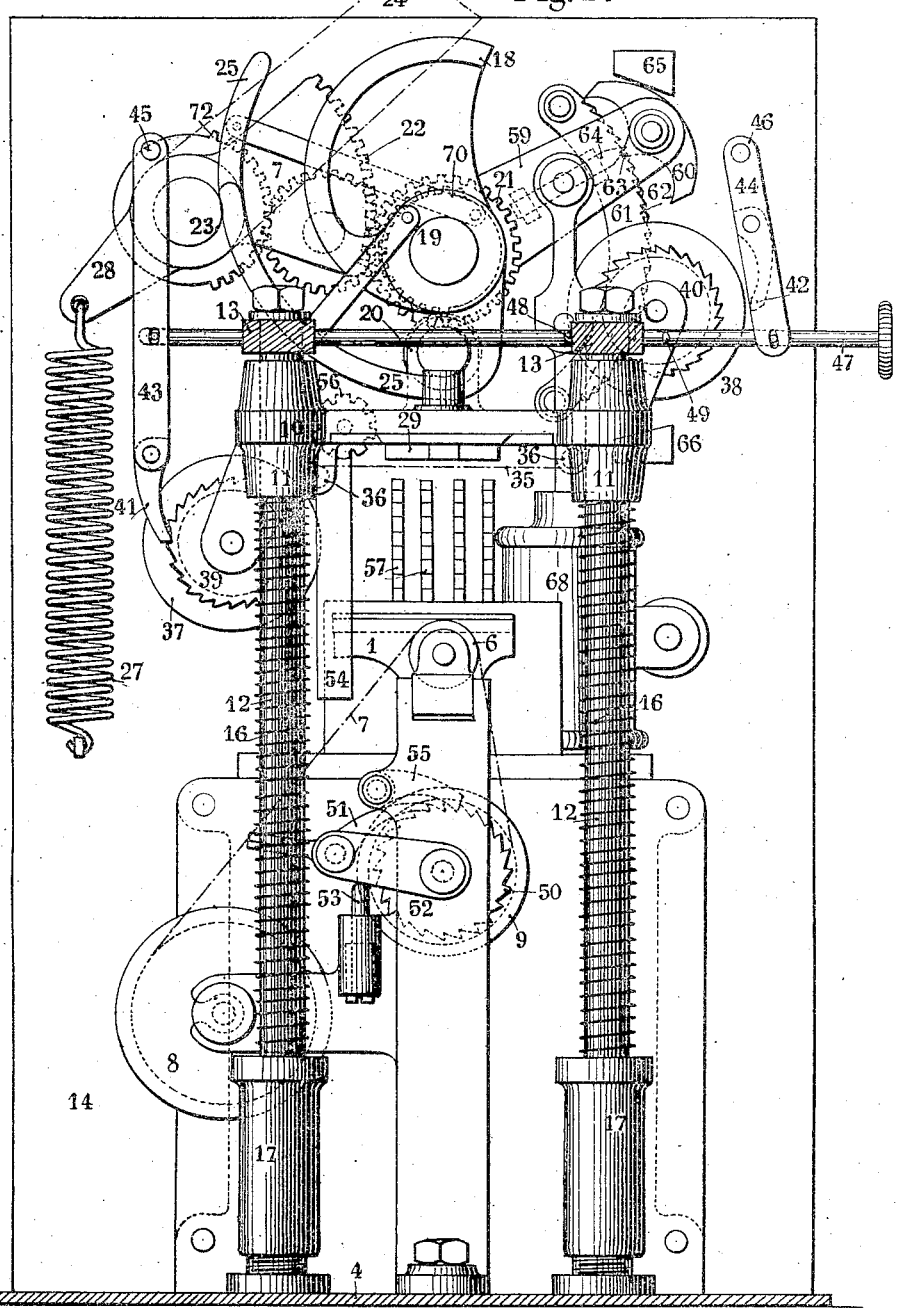
Figure 3:
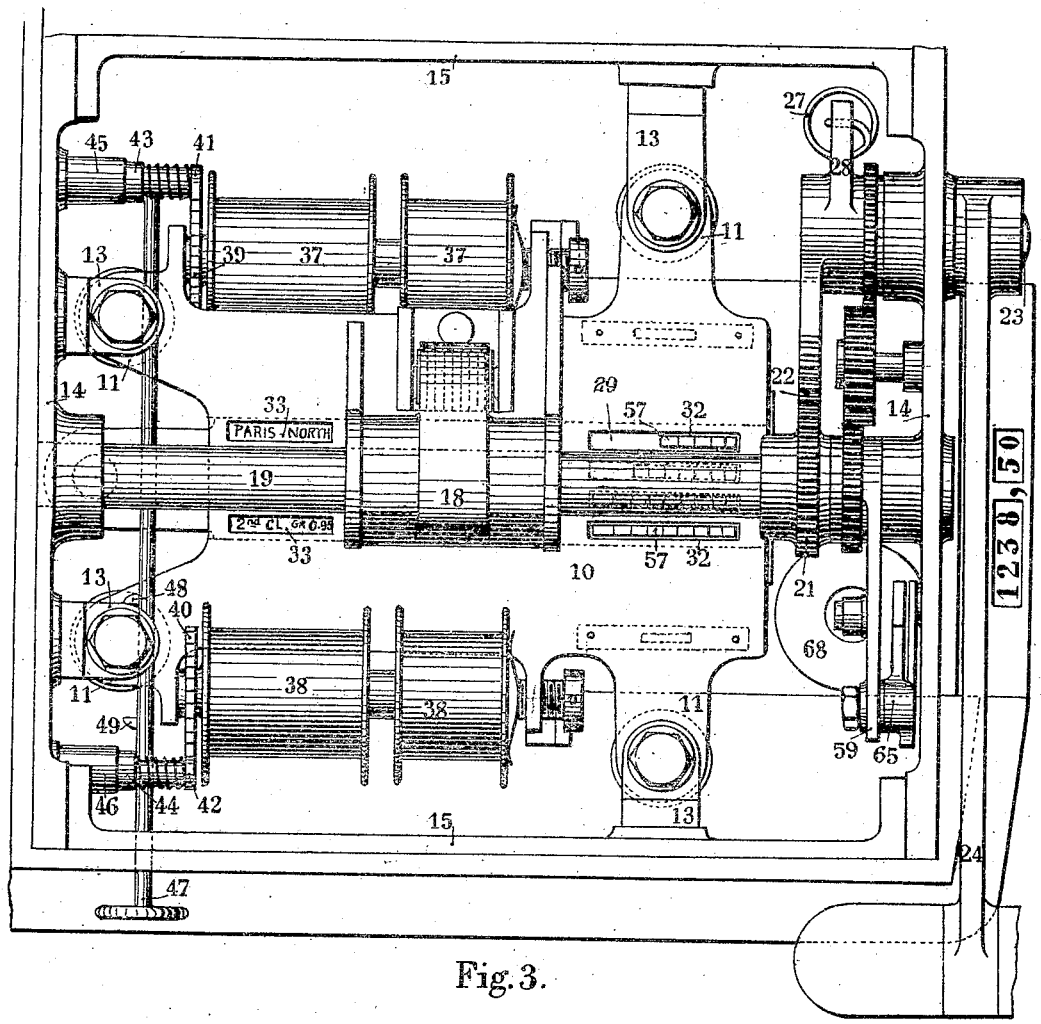
Figure 4:
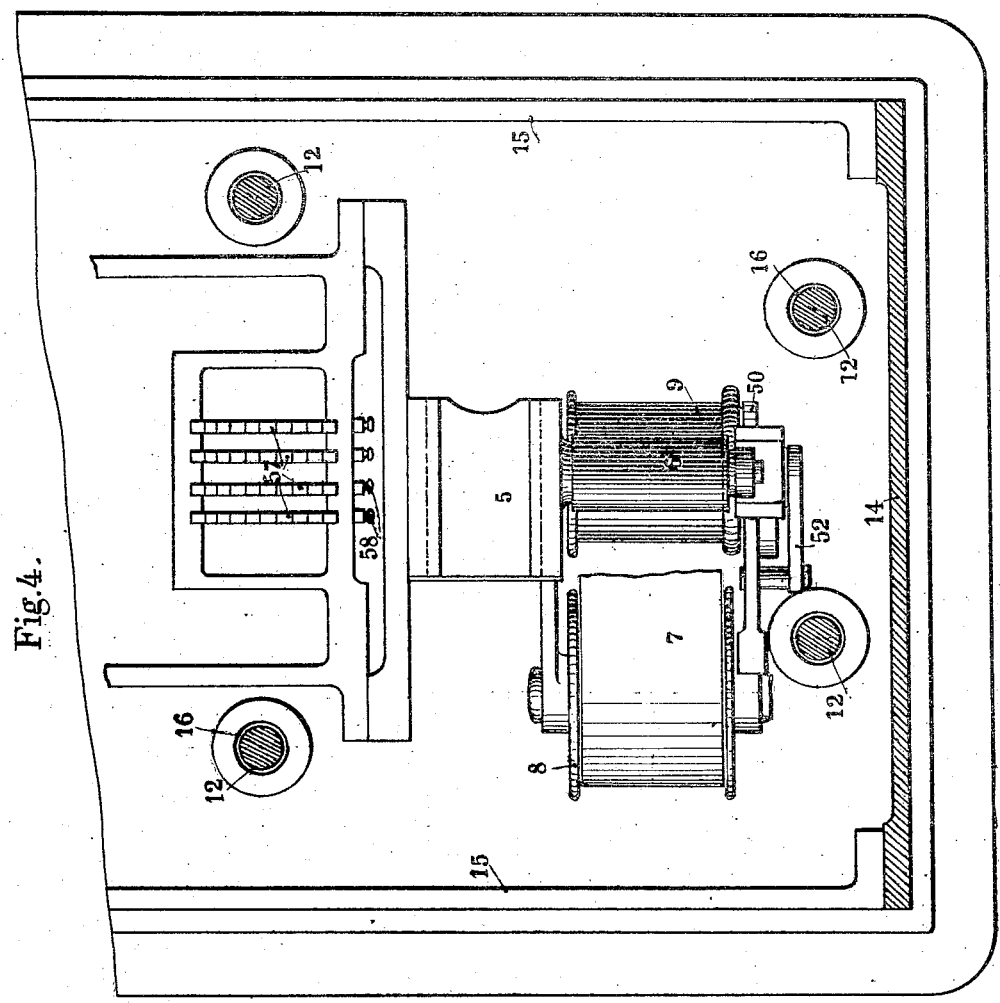

Referring to the drawings forming a part hereof—Figure 1 is a front view of the machine; Fig. 2 is a side view; Fig. 3 is a plan view; Fig. 4 is a horizontal section taken above the impression table; Fig. 5 is a plan view of a printing plate or block; Fig. 6 is a side view; Fig. 7 is a portion of a case adapted to receive the plates; Fig. 8 is a front view of the safety device, and Fig. 9 is a section taken on the line A—A of Fig. 8.

The present embodiment of the invention comprises an impression table 1 resting upon regulating screws 2, which are threaded through a frame 3 fixed to a pedestal 4, and the table is provided with an opening in which is seated a plate of rubber or other elastic material 5, the said plate forming the elastic surface upon which the ticket is to be placed while being printed.

The table 1 carries a roller 6 of rubber or other suitable material, the upper surface of the rubber being in the same plane with the upper surface of the block 5, and over the said roller a checking sheet 7 passes, which checking sheet is carried by a supply roller 8, and a receiving roller 9, the rollers being mounted upon shafts carried by the frame of the machine.

A plate 10 is arranged above the impression table, the plate being movable vertically and being provided at each corner with a sleeve 11, which are slidable on columns or standards 12 carried by the pedestal 4, and supported at their upper ends by brackets 13 fixed to cheek plates 14 of the machine, and cross ties 15 which connect the cheek plates to each other.

The plate 10 is normally supported in its uppermost position by means of springs 16 encircling the standards, the said springs being arranged between the sleeves 11, and turn buckles 17, one portion of which is secured to the base as shown, and the other is provided with a socket in which is received the lower end of the standard.

The plate is moved downward by a cam 18, keyed upon the shaft 19 and acting upon a roller 20 carried by the plate. The shaft 19 is journaled in bearings mounted upon the cheek plate 14 and carries a pinion 21 meshing with a toothed section 22, keyed upon a shaft 23, upon whose end is mounted the operating lever 24. The return movement of the plate is brought about by the springs 16, and by a spring 27 which is connected with the operating lever, and with the cheek plate as shown in Fig. 2. Cams 25 secured to the shaft 19 assist the return movement, by their engagement with the rollers 26 mounted upon the same shaft as the roller 20.

In the lower face of the plate 10, is a guideway for receiving the printing plate bearing the data for the ticket required. This printing plate (Figs. 5 and 6) is a metal blade 29 of rectangular form, bearing upon one of its faces the data 30 for the impression of the ticket in relief, and the inscription 31, and is also provided with a plurality of slots 32 of different length.

Upon its opposite face the printing plate bears an inscription which appears through an opening 33 in the upper face of the movable plate 10 in order that the ticket agent may be certain that the correct block is placed in the guideway. The plate is held in place in the guideways by a spring bolt 34, or by any other suitable retaining means.

Over the impression table 1 passes two inking ribbons 35, one for the ticket to be printed, and the other for the checking, and said ribbons are guided by rollers 36, and at their ends wind upon bobbins 37, 38, whose shafts are carried by the movable plates 10. Each inking ribbon receives a forward movement after each impression, and when it has arrived at the end of its course the direction of movement is reversed.

Each of the shafts of the bobbins 37, 38 bears a ratchet wheel 39, 40, the teeth of which are reversely arranged, and are actuated either by the pawl 41 or by the pawl 42, the said pawls being mounted upon the arms 43, 44 which are movable about the fixed shafts 45, 46, carried by the cheek plate 14, and are connected to each other by an operating rod or link 47.

When the rod 47 is moved forwardly as shown in Fig. 2, the pawl 41 engages the ratchet wheel 39, and when the lever 24 is operated to depress the rod, the pawl moves upward, and when the table is permitted to rise the pawl moves downward partially rotating the ratchet wheel, thus winding the ribbon upon the bobbin 37. To reverse the direction of movement of the ribbon, the rod 47 is moved rearwardly thus bringing the pawl 42 into engagement with the ratchet 40, and disengaging the pawl 31 from the ratchet 39 and when so arranged, at each upward movement of the plate 10 the inking ribbon is wound upon the bobbin 38. Each ribbon is provided at each of its ends with a blank portion uninked, or printed with an indicating mark for showing that the ribbon has arrived at the end of its travel and that the direction of travel must be reversed. The operating rod 47 is limited in its movement by the stops 48, 49. The receiving bobbin 9 of the checking sheet is provided with a ratchet 50, upon which acts a pawl 51 carried by an arm 52 movable about the shaft 59 and supported in its position of rest by the spring stop 53. A rod 54 is fixed to the plate 10 and when the said plate is at the lower end of its movement, the rod 54 engages the arm 52, and the pawl 51 engages with the succeeding tooth of the ratchet 50. In its movement the arm 52 moves the stop 53 backward by pressing its spring. When the plate 10 again rises the spring expands and the stop 53 moves the arm 52 back to its initial position, the pawl 51 sharing in its movement and imparting a partial rotation to the ratchet 50 and the receiving bobbins 9. A pawl 55 engages the ratchet wheel 50 for retaining said wheel in its adjusted position. This pawl is lifted by the pawl 51, when the said pawl is disconnected from the ratchet wheel 50, whereby to permit the checking sheet to freely unwind or wind up for the purpose of removal or replacing it.

The plate 10 may carry a dating apparatus 56, composed of a series of rings of letters or figures, the lower part of which comes flush with the characters on the block. This dating apparatus is placed so that the date may be printed on the ticket at the same time the remaining data is printed.

Opposite the slots of the grid with which the block is provided, are arranged stepped plates 57, each provided with ten steps, it being understood that the arrangement is based upon the decimal system. The distance from the rise of each step to the back of the plate corresponds to the length of a slot, the arrangement being such that the plate can enter the corresponding slot a predetermined distance. The plates 57 are independent of each other, and are slidable in grooves on the frame of the machine, and are retained in their uppermost position by springs 58. When the printing plate moves downward, the slots will engage the corresponding plates and will move them downward, the distance which they are moved being in proportion to the length of the slot, it being evident that the plate entering the longest slot will move downward the shortest distance. The movement of the plates is communicated to an adding or summing up apparatus.

The summing up apparatus comprises a certain number of number wheels $a$ each connected with a pinion $b$, having ten teeth (in case the decimal system is used), these pinions $b$ are mounted as shown in Fig. 1, the ones opposite the sectors $c$ and the others opposite sectors or complementary levers $c'$ movable about the same axis $c^2$ as the sectors $c$, the purpose of which will be hereinafter described. Furthermore, each pinion $b$ is connected with a finger $b'$ adapted to act, as hereinafter specified, upon the reporting mechanism.

The different groups or sets of numbered wheels $a$ and of pinions $b$ are loosely mounted on an axis $d$ carried by the harness composed of two cross-tied plates $e$ and movable about an axis $e'$; this harness carries furthermore an axis $e^2$ about which can rotate the stopping comb $f$ acted upon by the spring $f'$ against the adjustable abutting screw $g$.

The harness $e$ constantly acted upon by the returning spring $e^3$ is connected through the rod $h$ with a bent lever $i$ movable about the axis $i'$ returned by a spring $e^2$ and stopped by the fixed abutment $j'$; the spring $i^2$ is fastened to a retaining or holding up pawl $k$ movable about the axis $k'$ and stopped by the abutment $k^2$ which is carried by the rod $l$ secured to the lower part of the plate 10; this rod $l$ moreover carries a projection $l'$ adapted to act, on the descent of the plate 10, upon the small arm of the bent lever $i$ to bring the end of the great arm of the latter in mesh with the tooth of the holding on pawl $k$.

When one of the wheels of the summing up device has turned ten divisions (in case the decimal system is used), the report of the unity of the higher grade is obtained by means of the following mechanism:—

In front of every one of the fingers $b'$ are arranged levers $m$ movable about an axis $m'$; each of these levers bears at its upper end, an appendix $m^2$ upon which the corresponding finger $b'$ will act when the numbered wheel connected with this finger has made one turn, and two shoulders $m^3$, $m^4$ arranged beneath an abutment $c^3$ with which is provided each segment $c$ or $c'$ driving the following numbered wheel; this abutment $c^3$ limits the ascending stroke of the stepped plate connected with each segment through a rack 57$^a$ and the segment $c^4$.

Each lever $m$ is connected at its lower end through a small link $n$ with a stop lever $o$ movable about the axis $o'$; the whole of the levers $m$ and $o$ is returned to the position of rest by a spring $p$ against the abutment $q$. The stop lever $o$ is capable of engaging itself with the tooth of the pawl $r$ movable about the axis $r'$ and acted upon by the returning spring $r^2$.

The pawls $r$ have for their function to keep up the levers $m$ in the position to which they have been taken when forced back by the corresponding fingers $b'$; on each descent of the plate 10, these pawls are met from a cross-bar $s$ which serves to disengage these pawls $r$ by the levers $o$, $m$, so as to allow the stop levers $m$ to reassume their original position.

The cross-bar $s$ is supported by two bent cheeks $s'$ movable about an axis $s^2$. One of these cheeks $s'$ carries a rod connected through the rod $t$ with the latch $u$ movable about the axis $u'$ and operated upon the descent of the plate 10 by the abutment $l^3$ carried by the rod $l$.

At the end of the stroke of the plate 10, the abutment $l'$ of the rod $l$ meets the small arm of the lever $i$ and thus imparts an angular motion to the great arm of this lever $i$ which carries along or drives the harness $e$ and thus brings the pinions $b$ of the summing up apparatus in gear with the segments $c$, $c'$. In this angular motion of the harness $e$, the teeth of the stop comb $f$ are removed from the pinions $b$.

When the pinions $b$ are in gear with the segments $c$ and $c'$, the lever $i$ engages the pawl $k$ which has then lowered itself under the action of its returning spring $i^2$ as the abutment $k^2$ has been lowered; the harness $e$ thus steadied maintains the pinion $b$ of the numbered wheels in gear with the segments $c$ and $c'$.

When the plate 10 ascends again, each stepped plate 57 no longer being downwardly pressed, is raised again under the action of its returning spring 58 thereby transmitting to the segments $c$, $c'$ an angular motion, in a direction reverse to that it has imparted on its descent, until the abutment $c^3$ of the segment $c$ or $c'$ meets either the shoulder $m^3$ presented thereto by the corresponding lever $m$ when the latter is in its normal position, or the shoulder $m^4$ when a bringing forward should take place.

When a numbered wheel $a$, for instance the unit wheel, has turned ten divisions, the finger $b'$ connected with this wheel, meets the appendix $m^2$ of the lever $m$, arranged opposite the segment $c$ which drives the wheel $a$ of the tenths and forces back this lever so that it presents, under the abutment $c^3$ of this segment $c$, its shoulder $m^4$ which is at a lower level than the shoulder $m^3$. Under these conditions, the segment $c$ of the tenths receives, when the stepped plate 57 driving the same ascends, a greater angular motion than that it had received on the descent of this plate and the amplitude of this supplementary displacement is so determined that this segment $c$ will cause the pinion $b$ of the wheel of the tenths to turn one tooth more. The bringing forward of the tenths, of the hundreds, etc. take place in the same manner.

The segments $c'$ are placed opposite the numbered wheels of the units of a higher grade than that of the units controlled by the stepped plates. Thus, in the case represented, there are but four stepped plates controlling respectively the following units: centimes, decimes, francs, tenths of francs. Consequently the first segment $c'$ near to the last segment $c$ corresponds with the pinion $b$ of the numbered wheel $a$ of the hundreds of francs and so on.

From the hundreds of francs, the numbered wheels will never turn more than one division in one operation, that is to say in the case when the finger $b'$ of the neighboring numbered wheel having made a complete turn will have forced back the appendix $m^2$ to allow the abutment $c^3$ of the segment $c'$ to rest upon the shoulder $m^4$. At the end of the descending stroke of the plate 10, during the next operation, the abutment $l^3$ of the rod $l$ will bring back the segments $c'$ to the position shown on the drawing so that the abutment $c^3$ will lean against the shoulder $m^3$.

In order to prevent an incorrect operation and to compel the employee to make the operating lever 24 move through a complete stroke, an arm 59 connected to the operating lever 24 is provided at its end with a double pawl 60, which engages the toothed sectors 61, 62 when the machine is in operation. The teeth of the sectors 61, 62 are arranged in opposite directions, and the double pawl is provided with an angular portion 63 upon one face of which a spring bolt 64 acts for retaining one or the other arms of the double pawl 60 in engagement with the toothed sector. Stops 65, 66 are arranged at each end of the travel of the pawl to reverse the same, and the arm 59 is mounted upon the shaft 19 (Figs. 2 and 3) and receives movement from the lever 24 through gear wheels 70, 71 and 72. The arm 59 is connected by a connecting rod 69 with a dash pot 68 of suitable construction for preventing the sudden rise of the lever.

The different blocks or plates required by a station, will be placed in a set of pigeon holes 69, having compartments arranged for classes and stations, each station being provided with a group of blocks for each class, corresponding to single and return tickets, whole tickets, half tickets, etc., as shown in Fig. 7.

The operation of the improvement is as follows: A ticket being called for, the employee takes from its pigeon hole the plate 29 corresponding to the station and to the class and series of tickets, and inserts it in the movable plate 10. A blank printed ticket of the color, character and type required is introduced into the impression table, and the operating lever 24 is pulled down. The cams 18 compel the movable plate 10 to descend, and the plate applies the inking ribbon against the ticket and the checking sheet thus producing upon said ticket and sheet impressions of all the data on the blocks. In addition the slots of the movable plate engage the step plates 57, and the said plates are also a distance corresponding to the length of the slot. When the movable plate is near the end of its downward course, the rod 54 meets the arm 52 and brings the pawl 51 into engagement with the next tooth of the ratchet 50 of the receiving bobbin of the checking sheet 7.

When the operating lever is once started downward it cannot be raised again until it has arrived at the extreme end of travel, since the upper arm of the double pawl 60 is in engagement with the toothed sectors 61, whose teeth are directed to oppose the return of the lever. Whenever the lever arrives at the end of its downward travel, the pawl is reversed permitting the lever to move upward under the influence of the springs, its speed, however, being limited by the dash pot. During the upward movement of the plate 10 the arm 52 acted upon by its spring stop 53 returns to its initial position, and the pawl 51 causes the ratchet to turn an amount corresponding to an interline of a checking sheet 11, so that this latter, presents a blank line for the next impression. The stepped plates 57 move upward under the action of the springs 58, and this upward movement imparts the movement to the adding or summing up apparatus as formerly described. Shortly before the upward movement of the plate 10, one of the ratchets 39, 40 meets the pawl 41 which presents an obstacle to it and causes it to partially rotate thus partially rotating the bobbins 37 upon which the inking ribbons wind. The slots of the stop plate when using the decimal system are four in number, corresponding to the four decimal places, units, tens, hundreds, thousands, and the steps are ten in number on each plate corresponding to the first ten digits, and the length of each slot is so related to the vertical distance moved by the plate as to correctly move the number wheel corresponding to the plate a proper number of divisions to register the digit represented by the slot. As for instance, if the slot corresponding to units place is of a length such that it will engage the step corresponding to the digit 5, the units wheel will be rotated 5 divisions.

I claim—

1. A machine for printing, checking and automatically summing up the values of tickets, comprising an impression table, provided with a central opening and adapted to receive the ticket to be printed, means for causing a checking sheet to pass over the impression table, a movable plate bearing a printing slide, said plate being arranged in front of the impression table, independent and interchangeable printing slides corresponding to the different tickets to be issued, each of said printing slides being provided with a grid provided with slots of different lengths, a plurality of vertically movable plates having their upper end provided with stepped gradations for engagement by the slots, and a registering mechanism comprising a plurality of number wheels operated by the vertical movement of the plates.

2. In a machine for printing, checking and automatically summing up the values of tickets, a plurality of vertically movable plates, each of said plates having the upper end thereof provided with a plurality of steps or gradations corresponding in number to the digits, independent and interchangeable printing slides corresponding to the different tickets to be issued, each of said printing slides being provided with a grid having slots corresponding in number to the number of digits in the price of the ticket and corresponding in length to that width of the stepped plate representing said digit, an impression table for receiving the ticket adjacent to the vertically movable plates, a movable plate for receiving the interchangeable printing slides, means for moving the said plate to bring the printing slides into contact with the ticket to be printed and the slots in the grids over the upper ends of the stepped plates, and a registering mechanism comprising a plurality of number wheels operated by the vertical movement of the plates.

3. In a machine for printing, checking and automatically summing up the values of tickets, a plurality of vertically movable plates provided on one edge near the bottom with ratchet teeth, each of said plates having the upper end thereof provided with a plurality of steps or gradations corresponding in number to the digits, independent and interchangeable printing slides corresponding to the different tickets to be issued, each of said printing slides being provided with a grid having slots corresponding in number to the number of digits in the price of the ticket and corresponding in length to that width of the plate representing said digits, an impression table for receiving the ticket adjacent to the vertically movable plates, a movable plate for receiving the interchangeable printing slides, means for moving the plate to bring the printing slides into contact with the ticket to be printed and the slots in the grids over the upper ends of the plates, a series of number wheels operated by the movement of the plates, a pawl for engagement with the teeth of each plate and means on the plate for disengaging the pawls.

4. In a machine for printing, checking and automatically summing up the values of tickets, a plurality of vertically movable plates provided on one edge near the bottom with ratchet teeth, the distance between said teeth corresponding to the height of the steps or gradations, each of said plates having the upper end thereof provided with a plurality of steps or gradations corresponding in number to the digits, independent and interchangeable printing slides corresponding to the different tickets to be issued, each of said printing slides being provided with a grid having slots corresponding in number to the number of digits in the price of the ticket and corresponding in length to that width of the plate representing said digit, an impression table for receiving the ticket adjacent to the vertically movable plates, a movable plate for receiving the interchangeable printing slides, means for moving the plate to bring the printing slides into contact with the ticket to be printed and the slots in the grids over the upper ends of the plates, and a registering mechanism comprising a plurality of number wheels operated by the vertical movement of the plates.

5. A machine of the class described, comprising an impression table, a plate movable toward and from the impression table, independent and interchangeable printing slides, each of which is provided with a grid having slots of different lengths, the table being provided with means for receiving a printing slide, a plurality of vertically movable plates having their upper ends provided with stepped gradations for engagement of the slots, and a plurality of number wheels operated by the vertical movement of the plates.

The foregoing specification of my improvements in machines or apparatus for printing, checking, and automatically summing up the values of tickets of different kinds and series signed by me this 29th day of April 1907.

GEORGES ISIDORE FERDINAND SOULAGE.

Witnesses:
HANSON C. COXE,
MAURICE H. PIGNET.